(No Model.)

J. A. BARRETT.
ELECTRIC BATTERY.

No. 414,627. Patented Nov. 5, 1889.

WITNESSES:
Gabriel J. W. Galster.
Wm. H. Capel.

INVENTOR
John A. Barrett.

BY
Townsend & MacArthur
ATTORNEYS

UNITED STATES PATENT OFFICE.

JOHN A. BARRETT, OF BROOKLYN, NEW YORK.

ELECTRIC BATTERY.

SPECIFICATION forming part of Letters Patent No. 414,627, dated November 5, 1889.

Application filed February 8, 1888. Serial No. 263,357. (No model.)

*To all whom it may concern:*

Be it known that I, JOHN A. BARRETT, a citizen of the United States, and a resident of Brooklyn, in the county of Kings and State of New York, have invented a certain new and useful Electric Battery, of which the following is a specification.

The object of my invention is to provide an electric battery which shall be perfectly sealed against "creeping" or against the escape of gases from the interior of the battery.

In my prior patent, No. 374,862, dated December 13, 1887, I have described one means whereby an effectual seal may be secured. My present application relates to another means of securing the same result.

The invention is designed particularly for application to chloride-of-silver batteries, though it may also be applied to other forms of battery.

My invention consists in the combination, with the battery-cell, of a cap or cover, battery-wires passing through said cap and sealed therein in any suitable way, and a cementing or sealing material applied to the surfaces of the joint between the cap or cover and the cell.

My invention consists, also, in certain details of construction and improved combination of parts, which will be more particularly specified in the claims.

Figure 1:
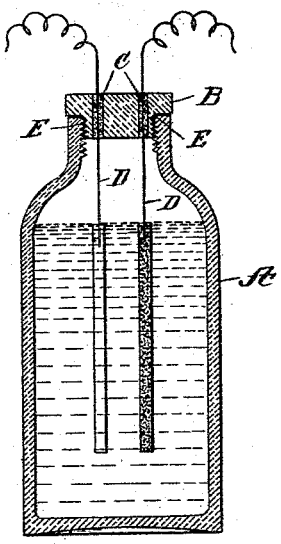
Figure 2:
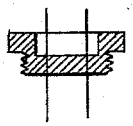

In the accompanying drawings I have shown, in Figure 1, in vertical central section, a battery embodying my invention. Fig. 2 represents a modified way of sealing the wires in the cover.

A indicates the battery-cell, which I preferably construct of hard rubber, because I prefer to employ a screw-thread joint between the cap and cell, and with this material a better screw-joint can be formed.

B indicates a cap or cover, which is secured to the cell by a screw-thread joint preferably, though other kinds of joint might be employed. I prefer to use an internal joint, since with this form a cover of greater thickness may conveniently be used. This is a consideration of some importance, because it is desirable that the openings in the cover for the battery-wires should be long, in order to secure the most effective sealing when a sealing of the kind indicated in Fig. 1 is resorted to.

D D indicate the battery-wires, which pass through narrow or constricted openings in the cap B and are sealed in said openings by some cementing material which will effectually close the space around the wires and prevent creeping. For this purpose I prefer to employ, among other things, shellac or a very thick solution of shellac and alcohol. The battery plates or elements may be those of any chloride-of-silver battery. In the present case they are supposed to be immersed in a mass of pasty material charged with sulphate of zinc.

In order to prevent creeping at the joint between the cap and cell, I apply to the surfaces of the joint at E a sealing material of any desired material, but prefer for this purpose a gummy, pitchy, or sticky material, such as a mixture of resin and oil, or a non-drying oil, such as a resin-oil. By this means an effectual joint against creeping may be produced.

It is obvious that my invention is not limited to the employment of a screw cap or cover, though it is better to use such a kind of joint in preference to a plain joint, as a better seal can be produced. It is likewise obvious that the wires may be sealed in the cap when the latter is of glass by fusing the glass around them, as indicated in Fig. 2.

What I claim as my invention is—

1. In an electric battery, a cell having a cap or cover into which the battery-wires are sealed, in combination with a cementing or sealing material applied to the surfaces of the joint between the cap or cover and cell.

2. In a sealed electric battery, an internal joint between the cap and cover, and battery-wires sealed in constricted openings passing through said cap, as and for the purpose described.

Signed at New York, in the county of New York and State of New York, this 10th day of January, A. D. 1888.

JOHN A. BARRETT.

Witnesses:
WM. H. CAPEL,
HUGO KOELKER.